US012563231B2

(12) United States Patent
Nishi et al.

(10) Patent No.: US 12,563,231 B2
(45) Date of Patent: Feb. 24, 2026

(54) THREE-DIMENSIONAL ENCODING/DECODING WITH DISTANCE AND DIRECTION COMPONENTS

(71) Applicant: Panasonic Intellectual Property Corporation of America, Torrance, CA (US)

(72) Inventors: Takahiro Nishi, Nara (JP); Toshiyasu Sugio, Osaka (JP); Noritaka Iguchi, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 80 days.

(21) Appl. No.: 18/410,546

(22) Filed: Jan. 11, 2024

(65) Prior Publication Data

US 2024/0146961 A1 May 2, 2024

Related U.S. Application Data

(63) Continuation of application No. PCT/JP2022/026703, filed on Jul. 5, 2022.

(60) Provisional application No. 63/224,184, filed on Jul. 21, 2021, provisional application No. 63/224,173, filed on Jul. 21, 2021.

(51) Int. Cl.
*H04N 19/597* (2014.01)

(52) U.S. Cl.
CPC .................................. *H04N 19/597* (2014.11)

(58) Field of Classification Search
CPC .... H04N 19/597; H04N 19/70; H04N 19/105; H04N 19/134; H04N 19/176; H04N 19/503; H04N 19/593; G06T 9/00
See application file for complete search history.

(56) References Cited

U.S. PATENT DOCUMENTS

| | | | | |
|---|---|---|---|---|
| 8,792,965 B2 * | 7/2014 | Ning | ..................... | G06T 11/006 382/274 |
| 2014/0375638 A1 | 12/2014 | Tomaru et al. | | |
| 2019/0082184 A1 * | 3/2019 | Hannuksela | ......... | H04N 19/563 |
| 2022/0303577 A1 | 9/2022 | Sugio et al. | | |

FOREIGN PATENT DOCUMENTS

| | | |
|---|---|---|
| WO | 2014/020663 | 2/2014 |
| WO | 2021/095879 | 5/2021 |

OTHER PUBLICATIONS

Extended European Search Report issued Nov. 11, 2024 in corresponding European Patent Application No. 22845778.4.

(Continued)

*Primary Examiner* — Richard T Torrente
(74) *Attorney, Agent, or Firm* — Wenderoth, Lind & Ponack, L.L.P.

(57) ABSTRACT

A three-dimensional data encoding method includes: determining, by a first method, a first prediction value of a distance component included in position information of a three-dimensional point; and determining, by a second method, a second prediction value of a direction component included in the position information, the second method being different from the first method. For example, the first method may be inter prediction, and the second method may be intra prediction.

10 Claims, 10 Drawing Sheets

(56)                References Cited

OTHER PUBLICATIONS

Ramasubramonian, Adarsh et al., "[G-PCC] [New proposal] Inter prediction with predictive geometry coding", ISO/IEC JTC 1/SC 29/WG 7, No. m56117, Jan. 2021.
International Search Report (ISR) issued on Sep. 27, 2022 in International (PCT) Application No. PCT/JP2022/026703.

* cited by examiner

Object

L1

Distance and
direction of object

Angular
field of
view

P1

Angular field of view
in horizontal direction

Angular field of view
in vertical direction

FIG. 7

| geometry_parameter_set( ) { | Descriptor |
|---|---|
| ... | |
|   gps_num_sensor_modes | ue(v) |
|   for( j = 0; j < gps_num_sensor_modes; j++ ){ | |
|     for( i = 0; i < 3; i++ ) | |
|       gps_sensor_origin_offset[ j ][ i ] | se(v) |
|     for( i = 0; i < 2; i++ ) | |
|       gps_sensor_direction[ j ][ i ] | |
|     for( i = 0; i < 2; i++ ){ | |
|       gps_sensor_fov_max[ j ][ i ] | se(v) |
|       gps_sensor_fov_min[ j ][ i ] | se(v) |
|     } | |
|   } | |
|   ... | |
| } | |

FIG. 8

| geometry_slice_header( ) { | Descriptor |
|---|---|
| ... | |
|   if( gps_num_sensor_modes > 1) | |
|     gsh_sensor_mode_index | ue(v) |
|   ... | |
| } | |

FIG. 9

| geometry_parameter_set( ) { | Descriptor |
|---|---|
| ... | |
| gps_fov_pred_mode_flag | u(1) |
| ... | |
| } | |

FIG. 10

| geometry_prediction_tree_node( ) { | Descriptor |
|---|---|
| ... | |
| if( gps_fov_pred_mode_flag ) | |
| pred_mode_angle | ae(v) |
| pred_mode | ae(v) |
| ... | |
| } | |

FIG. 15

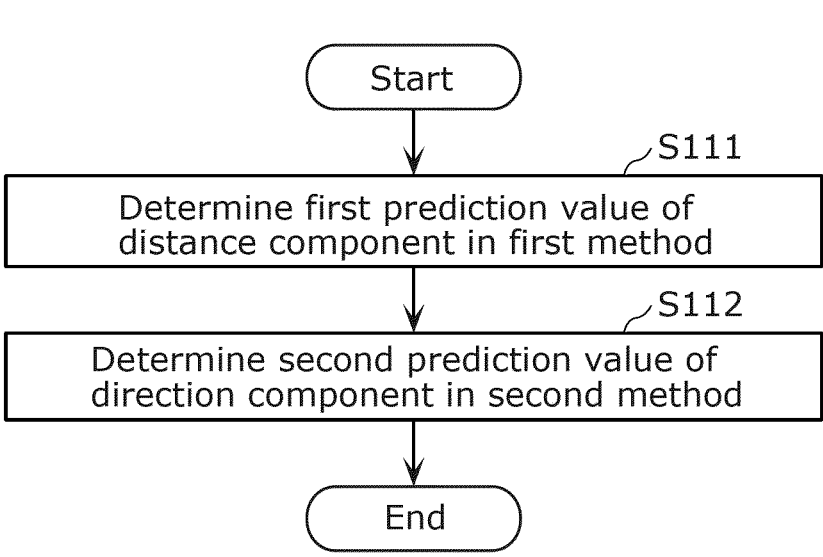

Start

S111
Determine first prediction value of distance component in first method

S112
Determine second prediction value of direction component in second method

End

FIG. 16

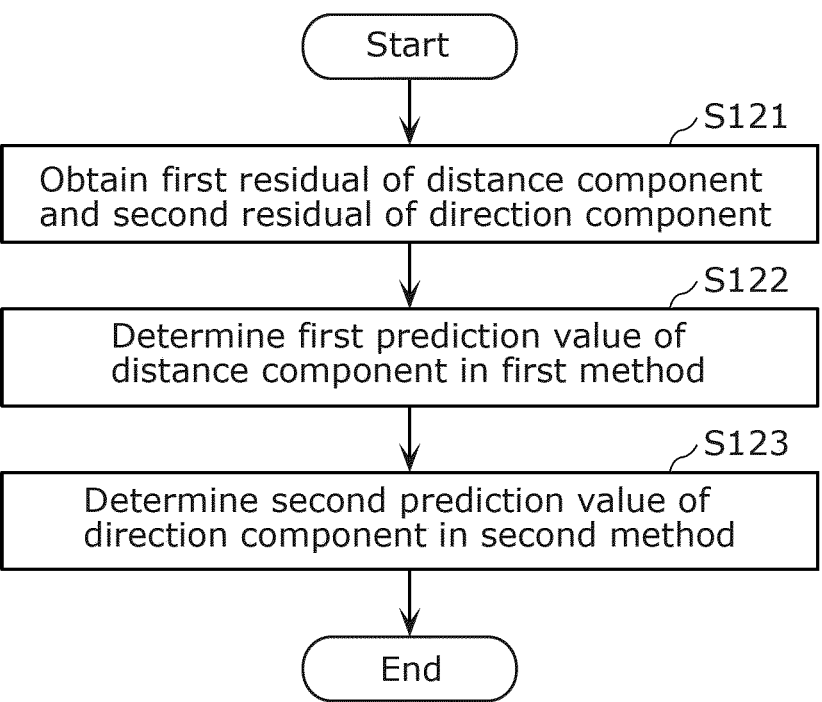

Start

S121
Obtain first residual of distance component and second residual of direction component S122
Determine first prediction value of distance component in first method S123
Determine second prediction value of direction component in second method End

THREE-DIMENSIONAL ENCODING/DECODING WITH DISTANCE AND DIRECTION COMPONENTS

CROSS REFERENCE TO RELATED APPLICATIONS

This is a continuation application of PCT International Application No. PCT/JP2022/026703 filed on Jul. 5, 2022, designating the United States of America, which is based on and claims priority of U.S. Provisional Patent Application No. 63/224,173 filed on Jul. 21, 2021 and U.S. Provisional Patent Application No. 63/224,184 filed on Jul. 21, 2021. The entire disclosures of the above-identified applications, including the specifications, drawings and claims are incorporated herein by reference in their entirety.

FIELD

The present disclosure relates to a three-dimensional data encoding method, a three-dimensional data decoding method, a three-dimensional data encoding device, and a three-dimensional data decoding device.

BACKGROUND

Devices or services utilizing three-dimensional data are expected to find their widespread use in a wide range of fields, such as computer vision that enables autonomous operations of cars or robots, map information, monitoring, infrastructure inspection, and video distribution. Three-dimensional data is obtained through various means including a distance sensor such as a rangefinder, as well as a stereo camera and a combination of a plurality of monocular cameras.

Methods of representing three-dimensional data include a method known as a point cloud scheme that represents the shape of a three-dimensional structure by a point cloud in a three-dimensional space. In the point cloud scheme, the positions and colors of a point cloud are stored. While point cloud is expected to be a mainstream method of representing three-dimensional data, a massive amount of data of a point cloud necessitates compression of the amount of three-dimensional data by encoding for accumulation and transmission, as in the case of a two-dimensional moving picture (examples include Moving Picture Experts Group-4 Advanced Video Coding (MPEG-4 AVC) and High Efficiency Video Coding (HEVC) standardized by MPEG).

Meanwhile, point cloud compression is partially supported by, for example, an open-source library (Point Cloud Library) for point cloud-related processing.

Furthermore, a technique for searching for and displaying a facility located in the surroundings of the vehicle by using three-dimensional map data is known (see, for example, Patent Literature (PTL) 1).

CITATION LIST

Patent Literature

PTL 1: International Publication WO 2014/020663

SUMMARY

Technical Problem

There has been a demand for improving coding efficiency in a three-dimensional data encoding process and a three-dimensional data decoding process.

The present disclosure has an object to provide a three-dimensional data encoding method, a three-dimensional data decoding method, a three-dimensional data encoding device, or a three-dimensional data decoding device that is capable of improving coding efficiency.

Solution to Problem

A three-dimensional data encoding method according to one aspect of the present disclosure comprising: determining, by a first method, a first prediction value of a distance component included in position information of a three-dimensional point; and determining, by a second method, a second prediction value of a direction component included in the position information, the second method being different from the first method.

A three-dimensional data decoding method according to one aspect of the present disclosure comprising: obtaining, from a bitstream, a first residual of a distance component included in position information of a three-dimensional point and a second residual of a direction component included in the position information; determining, by a first method, a first prediction value of the distance component; and determining, by a second method, a second prediction value of the direction component, the second method being different from the first method.

Advantageous Effects

The present disclosure provides a three-dimensional data encoding method, a three-dimensional data decoding method, a three-dimensional data encoding device, or a three-dimensional data decoding device that is capable of improving coding efficiency.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 7 is a diagram illustrating an example of a syntax of GPS according to the embodiment.

FIG. 8 is a diagram illustrating an example syntax of a slice header of position information according to the embodiment.

FIG. 9 is a diagram illustrating an example of a syntax of GPS according to the embodiment.

FIG. 10 is a diagram illustrating an example syntax of node information according to the embodiment.

FIG. 15 is a flowchart of a three-dimensional data encoding process according to the embodiment.

FIG. 16 is a flowchart of a three-dimensional data decoding process according to the embodiment.

DESCRIPTION OF EMBODIMENT

Figure 1:
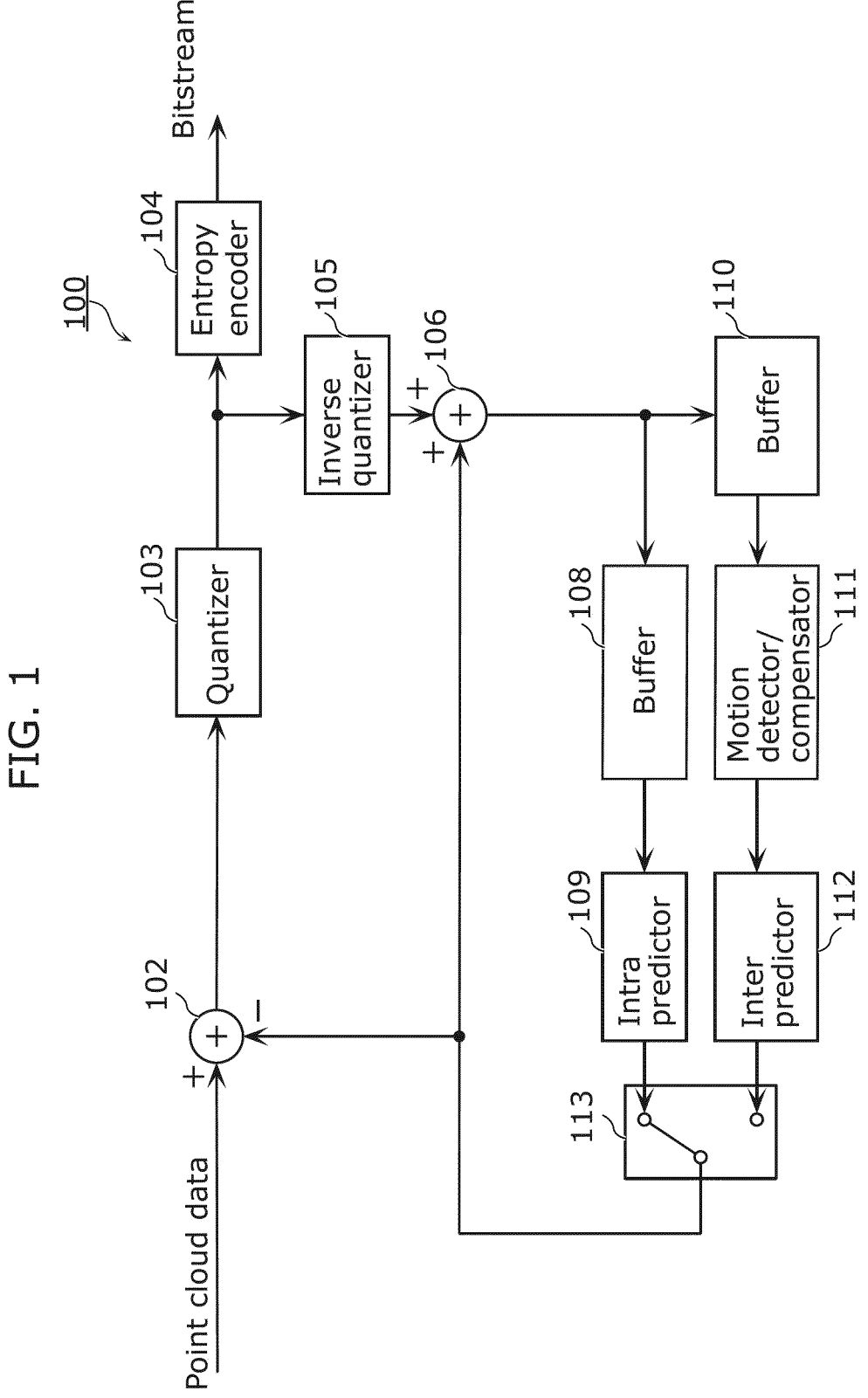
FIG. 1 is a block diagram of a three-dimensional data encoding device according to an embodiment.

A three-dimensional data encoding method according to one aspect of the present disclosure includes: determining, by a first method, a first prediction value of a distance component included in position information of a three-dimensional point; and determining, by a second method, a second prediction value of a direction component included in the position information, the second method being different from the first method.

According to this, the three-dimensional data encoding method can use a prediction method suitable for each of the distance component and the direction component, so that there is a possibility that the coding efficiency can be improved.

For example, the first method may be inter prediction, and the second method may be intra prediction.

According to this, there is a possibility that the three-dimensional data encoding method can improve the coding efficiency. Here, the distance component tends to be highly correlated with a prediction point temporally shifted, and the direction component tends to be spatially highly continuous. Therefore, the coding efficiency can be improved by using the inter prediction for the distance component and using the intra prediction for the direction component.

For example, in the second method, the second prediction value may be calculated according to a scan speed of a sensor for generating the three-dimensional point.

According to this, the three-dimensional data encoding method can perform a prediction that takes the scan speed into account, so that the coding efficiency can be improved.

For example, in the second method, the second prediction value may be calculated according to the scan speed and a scan acceleration rate of the sensor.

According to this, the three-dimensional data encoding method can perform a prediction that takes the scan acceleration into account, so that the coding efficiency can be improved.

For example, in the second method, the second prediction value may be calculated by $3 \times p0 - 3 \times p1 + p2$, where $p0$ may denote a direction component included in position information of a first three-dimensional point encoded, $p1$ may denote a direction component included in position information of a second three-dimensional point that precedes the first three-dimensional point in an encoding order, and $p2$ may denote a direction component included in position information of a third three-dimensional point that precedes the second three-dimensional point in the encoding order.

According to this, the three-dimensional data encoding method can perform a prediction that takes the scan speed and the scan acceleration into account, so that the coding efficiency can be improved. Specifically, $3 \times p0 - 3 \times p1 + p2 = p0 + (p0 - p1) + \{(p0 - p1) - (p1 - p2)\}$, where the term $(p0 - p1)$ relates to the scan speed, and the term $\{(p0 - p1) - (p1 - p2)\}$ relates to the scan acceleration.

For example, in the second method, the second prediction value may be calculated using a direction component of a first three-dimensional point and a direction component of a second three-dimensional point, the first three-dimensional point being located apart from the three-dimensional point by at least a predetermined distance, the second three-dimensional point being located apart from the three-dimensional point by at least the predetermined distance.

According to this, the three-dimensional data encoding method can calculate the prediction value using information of a plurality of three-dimensional points in a wider range, so that the precision of the prediction value can be improved. For example, a plurality of three-dimensional points at the same position (or close positions) can be prevented from being used for prediction.

For example, the first method and the second method may be prohibited from being a same one of the inter prediction or the intra prediction.

A three-dimensional data decoding method according to one aspect of the present disclosure includes: obtaining, from a bitstream, a first residual of a distance component included in position information of a three-dimensional point and a second residual of a direction component included in the position information; determining, by a first method, a first prediction value of the distance component; and determining, by a second method, a second prediction value of the direction component, the second method being different from the first method.

According to this, the three-dimensional data decoding method can use a prediction method suitable for each of the distance component and the direction component, so that there is a possibility that the coding efficiency can be improved.

For example, the first method may be inter prediction, and the second method may be intra prediction.

According to this, there is a possibility that the three-dimensional data decoding method can improve the coding efficiency. Here, the distance component tends to be highly correlated with a prediction point temporally shifted, and the direction component tends to be spatially highly continuous. Therefore, the coding efficiency can be improved by using the inter prediction for the distance component and using the intra prediction for the direction component.

For example, in the second method, the second prediction value may be calculated according to a scan speed of a sensor for generating the three-dimensional point.

According to this, the three-dimensional data decoding method can perform a prediction that takes the scan speed into account, so that the coding efficiency can be improved.

For example, in the second method, the second prediction value may be calculated according to the scan speed and a scan acceleration rate of the sensor.

According to this, the three-dimensional data decoding method can perform a prediction that takes the scan acceleration into account, so that the coding efficiency can be improved.

For example, in the second method, in the second method, the second prediction value may be calculated by $3 \times p0 - 3 \times p1 + p2$, where $p0$ may denote a direction component included in position information of a first three-dimensional point decoded, $p1$ may denote a direction component included in position information of a second three-dimensional point that precedes the first three-dimensional point in an encoding order, and $p2$ may denote a direction component included in position information of a third three-dimensional point that precedes the second three-dimensional point in the encoding order.

According to this, the three-dimensional data decoding method can perform a prediction that takes the scan speed and the scan acceleration into account, so that the coding efficiency can be improved. Specifically, $3 \times p0-3 \times p1+p2=p0+(p0-p1)+\{(p0-p1)-(p1-p2)\}$, where the term $(p0-p1)$ relates to the scan speed, and the term $\{(p0-p1)-(p1-p2)\}$ relates to the scan acceleration.

For example, in the second method, the second prediction value may be calculated using a direction component of a first three-dimensional point and a direction component of a second three-dimensional point, the first three-dimensional point being located apart from the three-dimensional point by at least a predetermined distance, the second three-dimensional point being located apart from the three-dimensional point by at least the predetermined distance.

According to this, the three-dimensional data decoding method can calculate the prediction value using information of a plurality of three-dimensional points in a wider range, so that the precision of the prediction value can be improved. For example, a plurality of three-dimensional points at the same position (or close positions) can be prevented from being used for prediction.

For example, the first method and the second method may be prohibited from being a same one of the inter prediction or the intra prediction.

A three-dimensional data encoding device according to one aspect of the present disclosure includes a processor and memory. Using the memory, the processor: determines, by a first method, a first prediction value of a distance component included in position information of a three-dimensional point; and determines, by a second method, a second prediction value of a direction component included in the position information, the second method being different from the first method.

According to this, the three-dimensional data encoding device can use a prediction method suitable for each of the distance component and the direction component, so that there is a possibility that the coding efficiency can be improved.

A three-dimensional data decoding device according to one aspect of the present disclosure includes a processor and memory. Using the memory, the processor: obtains, from a bitstream, a first residual of a distance component included in position information of a three-dimensional point and a second residual of a direction component included in the position information; determines, by a first method, a first prediction value of the distance component; and determines, by a second method, a second prediction value of the direction component, the second method being different from the first method.

According to this, the three-dimensional data decoding device can use a prediction method suitable for each of the distance component and the direction component, so that there is a possibility that the coding efficiency can be improved.

It is to be noted that these general or specific aspects may be implemented as a system, a method, an integrated circuit, a computer program, or a computer-readable recording medium such as a CD-ROM, or may be implemented as any combination of a system, a method, an integrated circuit, a computer program, and a recording medium.

Hereinafter, embodiments will be specifically described with reference to the drawings. It is to be noted that each of the following embodiments indicate a specific example of the present disclosure. The numerical values, shapes, materials, constituent elements, the arrangement and connection of the constituent elements, steps, the processing order of the steps, etc., indicated in the following embodiments are mere examples, and thus are not intended to limit the present disclosure. Among the constituent elements described in the following embodiments, constituent elements not recited in any one of the independent claims will be described as optional constituent elements.

Embodiment

First, a configuration of three-dimensional data encoding device 100 according to the present embodiment will be described. FIG. 1 is a block diagram of three-dimensional data encoding device 100 according to this embodiment. Three-dimensional data encoding device 100 generates a bitstream (encoded stream) by encoding point cloud data, which is three-dimensional data.

The point cloud data includes position information of a plurality of three-dimensional points. The position information indicates a three-dimensional position of each three-dimensional point. Note that the position information may be referred to as geometry information.

For example, the position information is expressed in the polar coordinate system, and includes one distance component and two direction components (angle components). Specifically, the position information includes distance d, elevation angle $\theta$, and horizontal angle $\varphi$. The point cloud data is data obtained with a laser sensor, such as LiDAR.

The point cloud data may include attribute information (such as color or reflectance) of each three-dimensional point, in addition to the position information. Although FIG. 1 shows a processor for encoding of position information of point cloud data, three-dimensional data encoding device 100 may include another processor, such as a processor for encoding of attribute information.

Three-dimensional data encoding device 100 includes subtractor 102, quantizer 103, entropy encoder 104, inverse quantizer 105, adder 106, buffer 108, intra predictor 109, buffer 10, motion detector/compensator 111, inter predictor 112, and switch 113.

Subtractor 102 generates a residual signal (referred to also as a prediction residual) by subtracting a prediction value from position information included in input point cloud data to be encoded. Quantizer 103 quantizes the residual signal. Entropy encoder 104 generates a bitstream by entropy-encoding the quantized residual signal. Entropy encoder 104 also entropy-encodes control information and adds the encoded information to the bitstream.

Inverse quantizer 105 generates the residual signal by inverse-quantizing the quantized residual signal obtained in quantizer 103. Adder 106 reproduces the position information by adding a prediction value to the residual signal generated by inverse quantizer 105. Buffer 108 holds the reproduced position information as a reference point cloud for intra prediction. Buffer 110 holds the reproduced position information as a reference point cloud for inter prediction.

Note that the reproduced position information may have a quantization error and may not completely agree with the original position information. Such a three-dimensional point reproduced through an encoding process and a decoding process is referred to as an encoded three-dimensional point, a decoded three-dimensional point, or a processed three-dimensional point.

Intra predictor 109 calculates a prediction value using position information of one or more reference points, which are other processed three-dimensional points belonging to the same frame as the three-dimensional point to be processed (referred to as a current point, hereinafter).

Motion detector/compensator 111 detects a displacement between a current frame, which is a frame including the current point, and a reference frame, which is a frame different from the current frame (this detection is referred to as motion detection), and corrects the position information of a point cloud included in the reference frame based on the detected displacement (this correction is referred to as motion compensation). Information indicating the detected displacement (motion information) is stored in a bitstream, for example.

Inter predictor 112 calculates a prediction value using position information of one or more reference points included in a point cloud subjected to the motion compensation. The motion detection and the motion compensation need not be performed.

Switch 113 selects one of the prediction value calculated by intra predictor 109 and the prediction value obtained in inter predictor 112, and outputs the selected prediction value to subtractor 102 and adder 106. That is, switch 113 switches between the intra prediction and the inter prediction for use. For example, switch 113 calculates a cost value in the case where the intra prediction is used and a cost value in the case where the inter prediction is used, and selects the prediction method with the smaller cost value. Note that the cost value is a value based on the code amount after encoding, and the smaller the code amount, the smaller the cost value is. Note that when the intra prediction and the inter prediction each have a plurality of schemes (a plurality of prediction modes), the prediction mode to be used is also determined based on the cost value. The manner of determining the prediction method (intra prediction or inter prediction) and the prediction mode is not limited to this, and the prediction method and the prediction mode may be determined, or candidate options thereof may be narrowed down, based on a setting externally specified or characteristics of the point cloud data.

Note that three-dimensional data encoding device 100 may obtain position information expressed in the Cartesian coordinate system, transform the obtained position information in the Cartesian coordinate system into position information in the polar coordinate system, and perform the encoding process described above on the obtained position information in the polar coordinate system. In that case, three-dimensional data encoding device 100 transforms the position information in the polar coordinate system reproduced by adder 106 into position information in the Cartesian coordinate system, calculates the difference between the obtained position information in the Cartesian coordinate system and the input original position information in the Cartesian coordinate system, and store information indicating the calculated difference in a bitstream.

Figure 2:
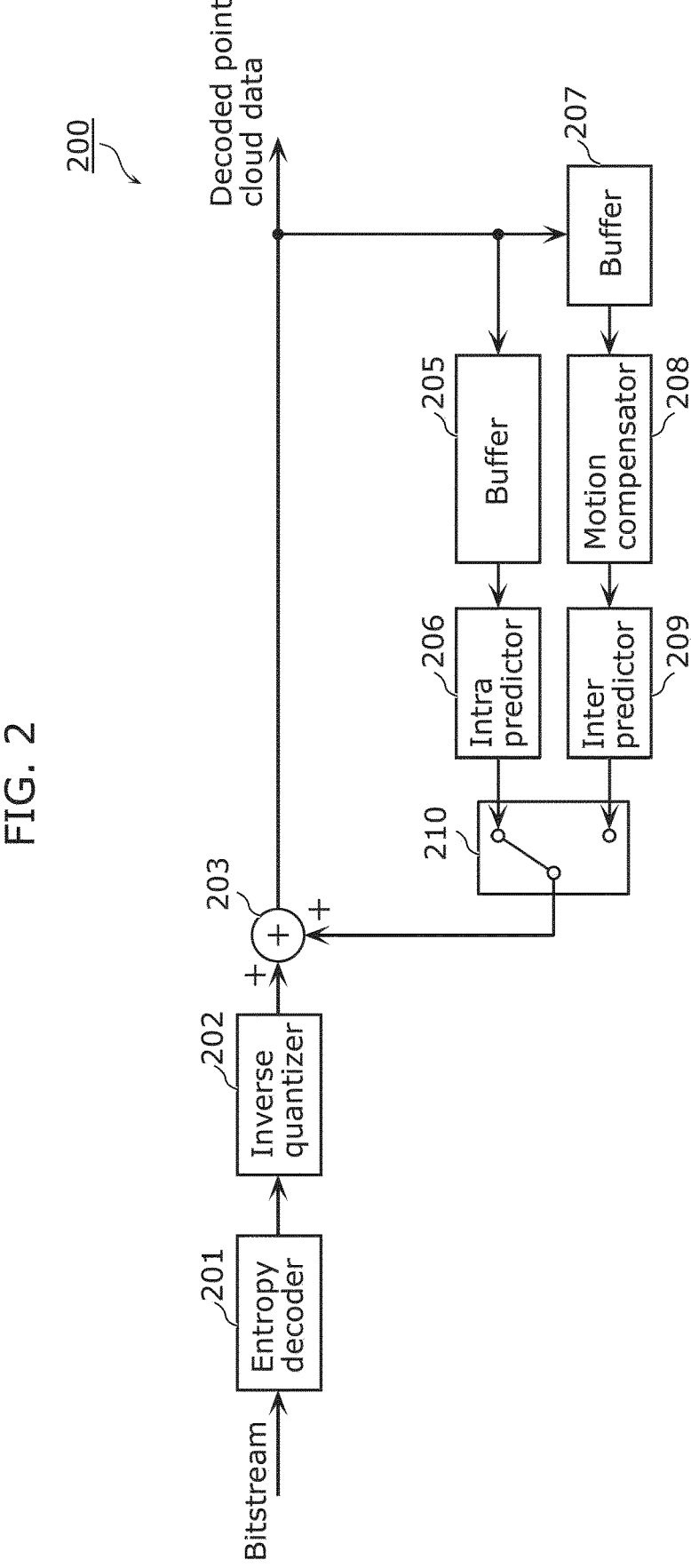
FIG. 2 is a block diagram of a three-dimensional data decoding device according to the embodiment.

Next, a configuration of three-dimensional data decoding device 200 that decodes a bitstream generated by three-dimensional data encoding device 100 described above will be described. FIG. 2 is a block diagram of three-dimensional data decoding device 200 according to this embodiment. Note that although FIG. 2 shows a processor for decoding of position information of a point cloud, three-dimensional data decoding device 200 may include another processor, such as a processor for decoding of attribute information of a point cloud. For example, three-dimensional data decoding device 200 generates decoded point cloud data by decoding a bitstream generated by three-dimensional data encoding device 100 illustrated in FIG. 1.

Three-dimensional data decoding device 200 includes entropy decoder 201, inverse quantizer 202, adder 203, buffer 205, intra predictor 206, buffer 207, motion compensator 208, inter predictor 209, and switch 210.

Three-dimensional data decoding device 200 obtains a bitstream generated by three-dimensional data encoding device 100.

Entropy decoder 201 generates a quantized residual signal, control information or the like by entropy-decoding the bitstream.

Inverse quantizer 202 generates a residual signal by inverse-quantizing the quantized residual signal obtained in entropy decoder 201. Adder 203 reproduces position information by adding a prediction value to the residual signal generated by inverse quantizer 202. The position information is output as decoded point cloud data.

Buffer 205 holds the reproduced position information as a reference point cloud for intra prediction. Buffer 207 holds the reproduced position information as a reference point cloud for inter prediction. Intra predictor 206 calculates a prediction value using position information of one or more reference points, which are other three-dimensional points belonging to the same frame as the current point.

Motion compensator 208 obtains, from the bitstream, motion information indicating a displacement between the current frame and the reference frame, and corrects position information of a point cloud included in the reference frame based on the displacement indicated by the motion information (this correction is referred to as motion compensation). Inter predictor 209 calculates a prediction value using position information of one or more reference points included in the point cloud subjected to the motion compensation. Note that the motion compensation need not be performed.

Switch 210 selects one of the prediction value calculated by intra predictor 206 and the prediction value obtained in inter predictor 209, and outputs the selected prediction value to adder 203. For example, switch 210 obtains information indicating a prediction method (intra prediction or inter prediction) from the bitstream, and determines the prediction method to be used based on the obtained information. Note that when the intra prediction and the inter prediction each have a plurality of schemes (a plurality of prediction modes), the information indicating the prediction mode is also obtained from the bitstream, and the prediction mode to be used is determined based on the obtained information.

Note that three-dimensional data decoding device 200 may transform the decoded position information expressed in the polar coordinate system into position information expressed in the Cartesian coordinate system, and output the position information expressed in the Cartesian coordinate system. In that case, three-dimensional data decoding device 200 obtains, from the bitstream, information indicating the difference between the original position information in the Cartesian coordinate system before the encoding and decoding and the position information in the Cartesian coordinate system after the decoding. Three-dimensional data decoding device 200 may transform the position information in the polar coordinate system reproduced by adder 203 into position information in the Cartesian coordinate system, add the difference indicated by the information described above to the obtained position information in the Cartesian coordinate system, and output the obtained position information in the Cartesian coordinate system.

Figure 3:
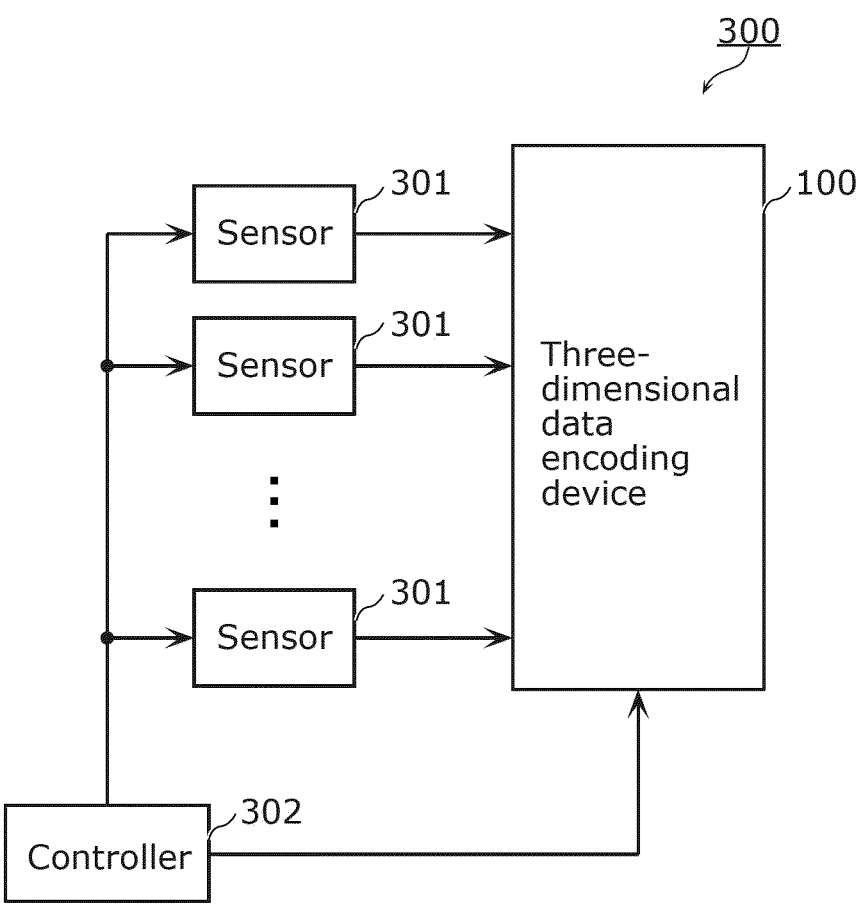
FIG. 3 is a block diagram illustrating a configuration of a mobile body according to the embodiment.

Next, a configuration of a mobile body including three-dimensional data encoding device 100 described above will be described. FIG. 3 is a block diagram illustrating a configuration of mobile body 300 according to this embodiment. For example, mobile body 300 is a vehicle, such as an automobile. Note that mobile body 300 may be a flying object, such as a drone, a train, or a ship, for example.

Mobile body 300 includes a plurality of sensors 301, controller 302, and three-dimensional data encoding device 100.

Sensor 301 generates three-dimensional data (point cloud data) by detecting a target object. Position information of each three-dimensional point included in the three-dimensional data is expressed in the polar coordinate, for example, and expressed by a distance component and two direction components (such as elevation angle and horizontal angle).

Controller 302 performs a synchronization control on the plurality of sensors 301. Controller 302 retains sensor information, which is information on the plurality of sensors 301, in advance and outputs the sensor information to three-dimensional data encoding device 100. The sensor information includes angular fields of view, positions of installation or the like of the sensors, for example.

Three-dimensional data encoding device 100 generates a bitstream by encoding the three-dimensional data generated by sensors 301. Three-dimensional data encoding device 100 adds, to the bitstream, the sensor information output from controller 302.

Figure 4:
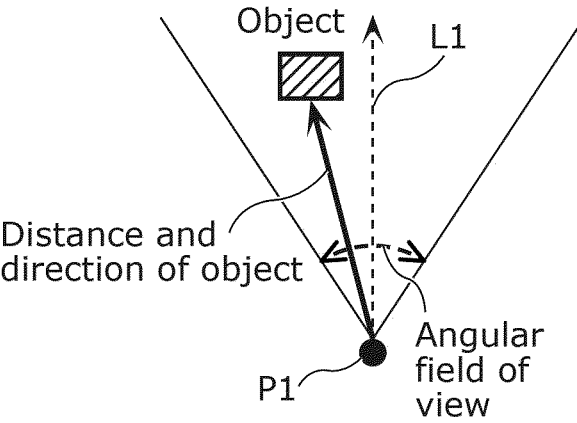
FIG. 4 is a diagram illustrating an example of an operation of a sensor according to the embodiment.

FIG. 4 is a diagram illustrating an example of an operation of sensor 301. FIG. 4 is a top view of the sensor. Sensor 301 detects the distance, direction and the like of an object located in the angular field of view. Sensor 301 detects the distance, direction and the like of an object viewed from base point P1 by scanning the angular field of view with a laser using a micro electro mechanical systems (MEMS) mirror, for example. Base point P1 indicates the position of sensor 301. Base point P1 is the original of the coordinate system of the three-dimensional data obtained by sensor 301. Reference line L1 indicates the direction of sensor 301, and is a bisector of the angular field of view in the horizontal direction and the vertical direction. That is, reference line L1 indicates the middle of the scan range.

Figure 5:
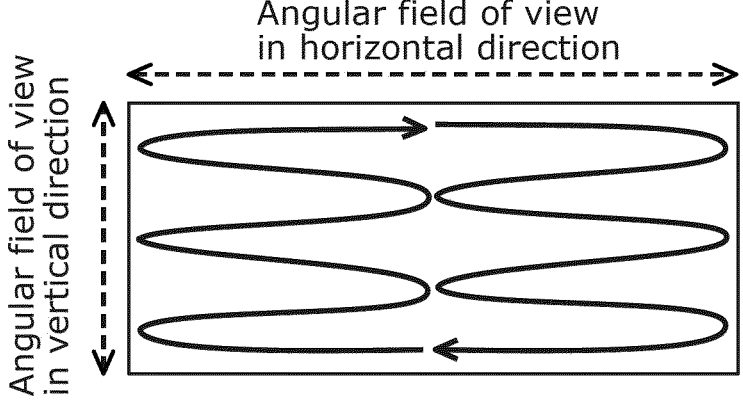
FIG. 5 is a diagram illustrating an example of a scan pattern of the sensor according to the embodiment.

FIG. 5 is a diagram illustrating an example of a scan pattern of sensor 301. Sensor 301 performs a continuous and comprehensive scan of the angular field of view in the horizontal direction and the vertical direction. This scan pattern is just an example, and other patterns are possible as far as the angular field of view is scanned in the horizontal direction and the vertical direction. As shown, the scan pattern of sensor 301 involves a folding in one or both of the horizontal direction and the vertical direction. That is, the scan of sensor 301 is different from the rotary scan, in which a continuous scan occurs in one direction.

Figure 6:
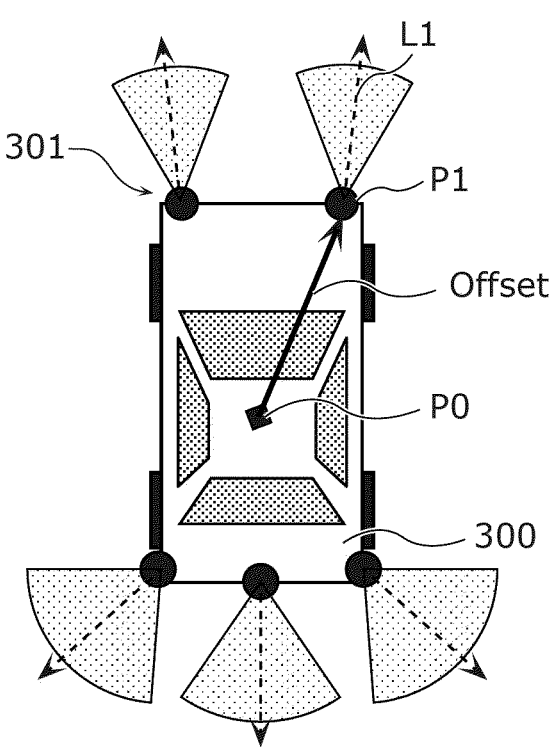
FIG. 6 is a diagram illustrating an example of an arrangement of sensors in a mobile body according to the embodiment.

FIG. 6 is a diagram illustrating an example of an arrangement of sensors 301 in mobile body 300. This drawing shows an example in the case where mobile body 300 is a vehicle.

Controller 302 manages information that defines a relative relationship between the coordinate system of sensor 301 and the coordinate system of mobile body 300 as information indicating the position of each sensor 301. Therefore, for example, three-dimensional data decoding device 200 or the like that uses detection results from a plurality of sensors 301 can integrate and use the plurality of detection results. For example, controller 302 manages information about an offset from base point P0 (such as the origin) of the coordinate system of mobile body 300 to base point P1 (such as the origin) of the coordinate system of sensors 301.

Controller 302 also manages inclination information indicating the direction of the coordinate system of sensors 301. The inclination information indicates an inclination of reference line L1 with respect to the coordinate system of mobile body 300, for example. For example, the inclination information includes an angle of reference line L1 with respect to a horizontal plane (x-y plane) of the coordinate system of mobile body 300 and angles of reference line L1 projected onto the horizontal plane of the coordinate system of mobile body 300 with respect to the x-axis and the y axis.

Controller 302 also manages angular-field-of-view information indicating the angular fields of view of sensor 301 in the horizontal direction and the vertical direction. For example, the angular-field-of-view information indicates minimum values and maximum values of the angles in the horizontal direction and the vertical direction with respect to reference line L1.

Note that these items of information are just examples, and any information can be used that allows unique determination of the position and angular field of view of each sensor 301 in the coordinate system of mobile body 300.

Although an example is shown here in which a plurality of sensors 301 are mounted on a vehicle, mobile body 300 may be a robot, a drone or the like.

Although an example in which sensor 301 that sequentially scans the angular field of view is used is shown here as an example of sensor 301, sensor 301 may be a sensor that detects the distance, the direction and the like of an object located in the angular field of view in a collective manner.

Three-dimensional data encoding device 100 adds the sensor information described above to the bitstream. FIG. 7 is a diagram illustrating an example of a syntax for notification of the sensor information described above. In the example syntax in FIG. 7, the sensor information is stored in a geometry parameter set (GPS). Note that the example syntax is a syntax of GPS included in the bitstream in the case where data obtained by each sensor 301 is separately encoded. For example, data obtained by one sensor 301 is encoded as one or more slices. That is, data obtained by different sensors 301 are included in different slices.

Note that the sensor information may be stored in a sequence parameter set (SPS), which is of a higher order than GPS, or control information of a system layer. SPS is a parameter set (control information) in units of sequences including a plurality of frames. SPS is also a common parameter set for the position information and the attribute information. GPS is a parameter set in units of frames, and is a parameter set for the position information.

As illustrated in FIG. 7, GPS (geometry_parameter_set) includes gps_num_sensor_modes, gps_sensor_origin_offset[j][i], gps_sensor_direction[j][i], gps_sensor_fov_max[j][i], and gps_sensor_fov_min[j][i].

gps_num_sensor_modes indicates the number of sensing modes. For example, a plurality of sensing modes correspond to a plurality of sensors, respectively. That is, gps_num_sensor_modes may indicate the number of sensors 301. Each sensing mode is associated with sensor information of a sensor corresponding to the sensing mode. Note that the number of sensing modes may be greater than the number of sensors 301. For example, when one sensor has a plurality of operation modes with different angular fields of view, a sensing mode may be set for each operation mode.

gps_sensor_origin_offset[j][i] indicates an offset from base point P0 (such as the origin) of the coordinate system of mobile body 300 to base point P1 (such as the origin) of the coordinate system of sensors 301.

gps_sensor_direction[j][i] indicates reference line L1 indicating the direction of the coordinate system of sensors 301. For example, gps_sensor_direction[j][i] indicates an angle of reference line L1 with respect to the horizontal plane (x-y plane) of the coordinate system of mobile body 300 and angles of reference line L1 projected onto the horizontal plane of the coordinate system of mobile body 300 with respect to the x-axis and the y axis.

gps_sensor_fov_max[j][i] and gps_sensor_fov_min[j][i] indicate angular fields of view in the horizontal direction and the vertical direction. More specifically, gps_sensor_fov_max[j][i] indicates maximum values of the angles in the horizontal direction and the vertical direction with respect to reference line L1. gps_sensor_fov_min[j][i] indicates minimum values of the angles in the horizontal direction and the vertical direction with respect to reference line L1.

Here, j is an index value of the sensing mode, and is a serial number set for each sensing mode, for example. i is an index value concerning the coordinate components. For gps_sensor_origin_offset, i indicates an x-axis, y-axis, or z-axis component. For gps_sensor_direction, gps_sensor_fov_max, and gps_sensor_fov_min, i indicates a horizontal angle component or an elevation angle component.

Note that three-dimensional data encoding device 100 or controller 302 may transform angular-field-of-view information (gps_sensor_fov_max and gps_sensor_fov_min) indicating the angular fields of view of sensor 301 in the horizontal direction and the vertical direction and the direction component of the point cloud data obtained by sensor 301 so that reference line L1 indicating the direction of the coordinate system of sensor 301 is parallel to a predetermined direction (such as the x axis or y axis) of the coordinate system of mobile body 300, for example. In that case, three-dimensional data encoding device 100 may encode the transformed point cloud data and add the transformed angular-field-of-view information to the bitstream. Three-dimensional data encoding device 100 may omit notification of gps_sensor_direction (storage of the same in the bitstream). These items of information are just examples, and information may be used that allows unique determination of the position, angular field of view or the like of each sensor 301 in the coordinate system of mobile body 300.

Three-dimensional data encoding device 100 may determine a range of values of the direction components (horizontal angles and elevation angles) of the data obtained by sensor 301 according to the angular fields of view in the horizontal direction and the vertical direction, and determine a bit precision of the encoded data according to the determined range of values. Three-dimensional data encoding device 100 may select a context used for arithmetic encoding from a plurality of contexts according to the angular fields of view in the horizontal direction and the vertical direction or the determined range of values. This can improve the coding efficiency.

For example, three-dimensional data encoding device 100 may determine the bit precision of the encoded data of the direction component according to floor(log$_2$(max(1, gps_sensor_fov_max[j] [i]-gps_sensor_fov_min[j] [i])))+1. Note that floor( ) is a function that discards any decimal portion of the numeric value in the parentheses, and max( ) is a function that choose the maximum value of the values in the parentheses.

As illustrated in FIG. 7, GPS or the like may store information about the number of sensing modes of sensors 301 (gps_num_sensor_modes) and the same number of items of sensor information as the number of sensing modes, the sensor information concerning the relative relationship between the coordinate system of sensors 301 and the coordinate system of mobile body 300. FIG. 8 is a diagram illustrating an example syntax of a slice header (geometry_slice_header) of position information. Here, a slice is a unit of division of a frame, and one frame is formed by a plurality of slices.

As illustrated in FIG. 8, the slice header includes gsh_sensor_mode_index that indicates an index value of the sensing mode corresponding to the position information of the slice. This allows three-dimensional data encoding device 100 to select a different sensing mode for each slice.

Note that three-dimensional data encoding device 100 may set gps_num_sensor_modes at 0, and omit storage of the sensor information in the bitstream. In that case, three-dimensional data encoding device 100 and three-dimensional data decoding device 200 may use a predetermined value (such as 360 degrees as the angular field of view in the horizontal direction), or may use a value notified by a higher-order system or another syntax. When the sensing mode can be uniquely determined, such as when gps_num_sensor_modes is equal to or less than 1, three-dimensional data encoding device 100 may omit storage of gsh_sensor_mode_index in the bitstream.

As described above, three-dimensional data encoding device 100 stores sensor information concerning the relative relationship between the coordinate system of sensors 301 and the coordinate system of mobile body 300, for example, in the bitstream. This allows the system including three-dimensional data decoding device 200 that decodes the bitstream to reproduce a three-dimensional structure or position of a structure or object in a wider range around mobile body 300 by integrating data obtained by the plurality of sensors 301 using the sensor information or the like included in the bitstream.

In the following, a prediction method used when three-dimensional data encoding device 100 encodes the data obtained by sensors 301 described above will be described. First, an intra prediction method will be described.

When the processing order (encoding order or decoding order) for the nodes is set according to the scan order, three-dimensional data encoding device 100 may derive a prediction value of a coordinate of a current node to be processed (to be encoded or decoded) according to the following formula (Formula 1) (or a formula equivalent to (Formula 1)) that takes a variation in laser scan speed into account.

$$\text{Prediction value}=p0+(p0-p1)+\{(p0-p1)-(p1-p2)\}=3 \times p0-3 \times p1+p2 \qquad \text{(Formula 1)}$$

Note that p0 is a coordinate of a parent node of the current node in a prediction tree, p1 is a coordinate of a grandparent node, and p2 is a coordinate of a grand-grandparent node. The prediction tree is a tree structure that represents a reference relationship in prediction.

In (Formula 1), the term (p0–p1) relates to the scan speed, the term {(p0–p1)–(p1–p2)} relates to a variation in scan speed (scan acceleration). That is, (Formula 1) includes the term relating to the scan speed and the term relating to the scan acceleration.

For example, the scan speed is an angular speed. The scan speed and the value of the detected direction component tend to be highly correlated. Therefore, the prediction precision is improved by calculating the prediction value according to the scan speed. For example, the scan acceleration is an angular acceleration. The scan acceleration and the value of the detected direction component tend to be highly correlated. Therefore, the prediction precision is improved by calculating the prediction value according to the scan acceleration.

Three-dimensional data encoding device 100 may use different prediction methods for the two direction components (horizontal angle and elevation angle) and the distance component of the position information of a node. For example, three-dimensional data encoding device 100 determines prediction values of the direction components in a method selected from among a plurality of prediction methods including the prediction according to the above formula (Formula 1). Here, the plurality of prediction methods include at least one of (0) no prediction (prediction value=0), (1) a differential prediction with respect to p0 (prediction value=p0), (2) a linear prediction based on p0 and p1 (prediction value=2×p0−p1), (3) a parallelogram prediction (prediction value=2×p0+p1−p2), (4) a differential prediction with respect to p1 (prediction value=p1), (5) a differential prediction with respect to p2 (prediction value=p2), (6) an average value of two or more of p0, p1, and p2 (prediction value=(p0+p1)/2 when p0 and p1 are used), and (7) a non-linear prediction using a first distance between p1 and p0 and a second distance between p2 and p1.

Three-dimensional data encoding device 100 may use, as a prediction value of the distance component, a distance component of one node selected from among a plurality of encoded nodes. Note that the prediction method for the distance component may include at least one of (0) to (7) described above.

For example, FIG. 9 is a diagram illustrating an example syntax of GPS in this case. As illustrated in FIG. 9, GPS may include gps_fov_pred_mode_flag, which is information indicating whether prediction methods for the direction components and the distance component are individually set or not.

FIG. 10 is a diagram illustrating an example syntax of node information (geometry_prediction_tree_node( ) about a node in this case. As illustrated in FIG. 10, when gps_fov_pred_mode_flag is true, the node information includes pred_mode_angle, which indicates a prediction mode for the direction component, and pred_mode. In this case, pred_mode indicates a prediction mode for the distance component. When gps_fov_pred_mode_flag is false, the node information does not include pred_mode_angle, but includes pred_mode. In this case, pred_mode indicates a prediction mode commonly used for the direction components and the distance component.

Figure 11:
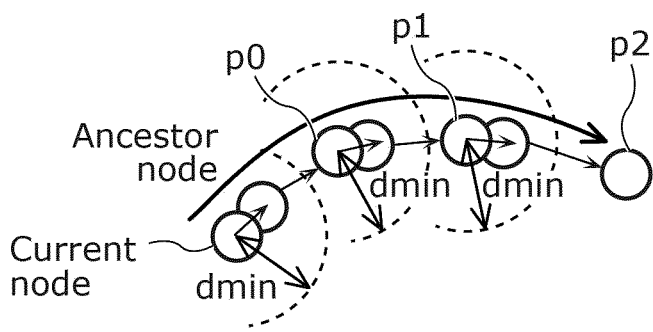
FIG. 11 is a diagram for describing a selection method for a reference node according to the embodiment.

Three-dimensional data encoding device 100 may use the following method as a method of selecting p0, p1, and p2 used in (Formula 1) described above and the prediction methods (1) to (7) described above. FIG. 11 is a diagram for describing a selection method for a reference node. As illustrated in FIG. 11, three-dimensional data encoding device 100 may set, at p0, p1, and p2, ancestor nodes spaced apart from each other by distance drain or more based on the two direction components. That is, the current node is at distance drain or more from p0, p0 is at distance drain or more from p1, and p1 is at distance drain or more from p2. More specifically, among a plurality of ancestor nodes (processed nodes) at distance drain or more from the current node, p0 is the closest node to the current node in the prediction tree. Among a plurality of ancestor nodes of p0 at distance drain or more from p0, p1 is the closest node to p0 in the prediction tree. Among a plurality of ancestor nodes of p1 at distance drain or more from p1, p2 is the closest node to p1 in the prediction tree.

Three-dimensional data encoding device 100 may store information indicating drain as information for each sensing mode in the syntax illustrated in FIG. 7, for example. Alternatively, when the sampling interval based on the two direction components for each sensing mode is known, three-dimensional data encoding device 100 may store, in the syntax illustrated in FIG. 7, information indicating the sampling interval as information for each sensing mode. In that case, three-dimensional data encoding device 100 and three-dimensional data decoding device 200 determine drain based on the sampling interval. For example, three-dimensional data encoding device 100 and three-dimensional data decoding device 200 may use, as drain, a half of the value of the sampling interval.

The method of determining the distance between nodes can be any method that can determine that two points are spaced apart from each other by a certain distance by comparison with the sampling interval. For example, three-dimensional data encoding device 100 may compare the sum of squares of the two direction components and the square of drain, determine that the distance between the nodes is equal to or greater than drain when the sum of squares of the two direction components is equal to or greater than the square of drain, and otherwise determine that the distance between the nodes is smaller than drain. Alternatively, three-dimensional data encoding device 100 may compare each of the two direction components with a predetermined value based on drain (such as the following (Formula 2) or an approximate value thereof), determine that the distance between the nodes is equal to or greater than drain when at least one of the two direction components is equal to or greater than the predetermined value, and otherwise determine that the distance between the nodes is smaller than drain.

[Math. 1]

$$drain/\sqrt{2} \qquad\qquad\qquad (Formula\ 2)$$

As described above, three-dimensional data encoding device 100 predicts the two direction components (horizontal angle and elevation angle) of the position information of a node by taking a variation in laser scan speed (acceleration) into account. Therefore, three-dimensional data encoding device 100 can precisely predict the direction components, and thus there is a possibility that the coding efficiency can be improved.

Figure 12:
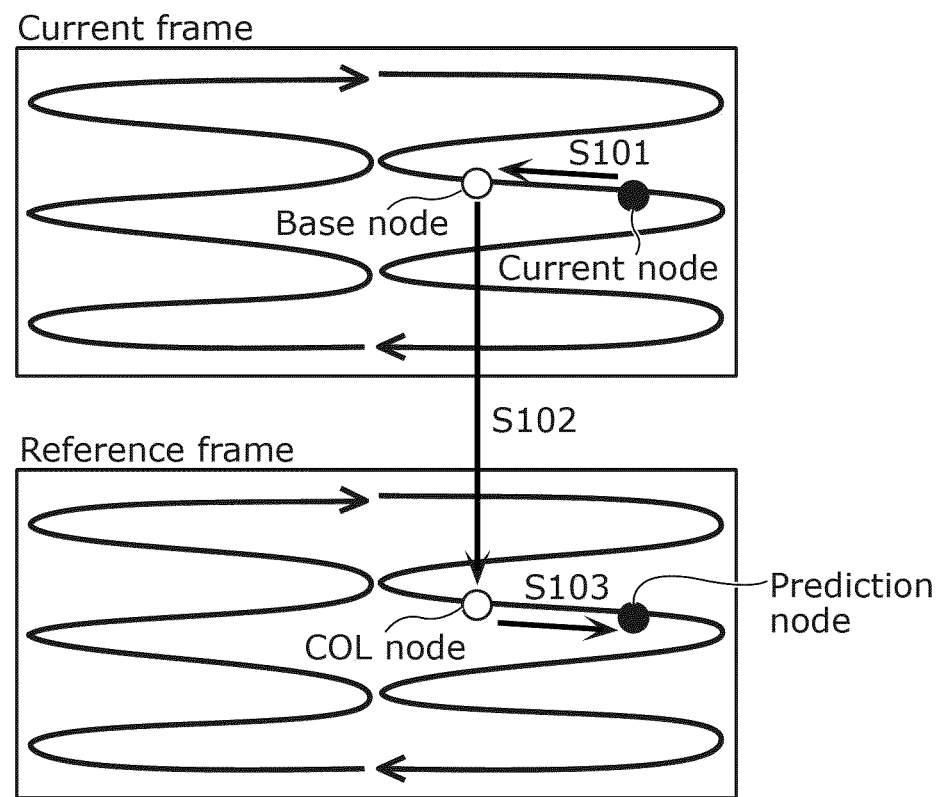
FIG. 12 is a diagram illustrating a procedure of an inter prediction method according to the embodiment.

Next, an inter prediction method will be described. FIG. 12 is a diagram illustrating a procedure of an inter prediction method by three-dimensional data encoding device 100. An example will be described here in which the processing order (encoding order or decoding order) for the nodes is set according to the scan order. In this example, three-dimensional data encoding device 100 selects a prediction node according to the two direction components (horizontal angle and elevation angle) of the position information of a node.

Figure 13:
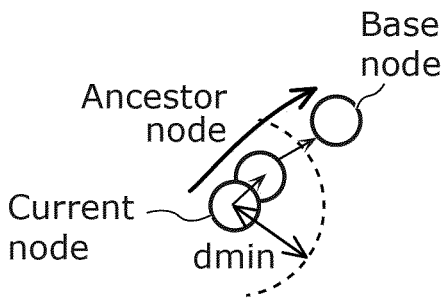
FIG. 13 is a diagram illustrating an example selection of a base node according to the embodiment.

First, in Step S101 illustrated in FIG. 12, three-dimensional data encoding device 100 selects a base node from a plurality of nodes included in a current frame including a current node. More specifically, the base node is a node processed (encoded or decoded) before the current node, and is a parent node of the current node in a prediction tree, for example. Note that the base node may be a node at distance drain or more from the current node. FIG. 13 is a diagram illustrating an example selection of a base node in this case. As illustrated in FIG. 13, three-dimensional data encoding device 100 may select, as a base node, an ancestor node whose distance from the current node based on the two direction components is greater than drain.

In Step S102, three-dimensional data encoding device 100 then selects a COL node from a plurality of nodes included in a reference frame that is a processed frame different from the current frame. The COL node is a node whose position indicated by the two direction components is the same as or close to the position of the base node (a node whose position is the closest to the position of the base node, for example).

Figure 14:
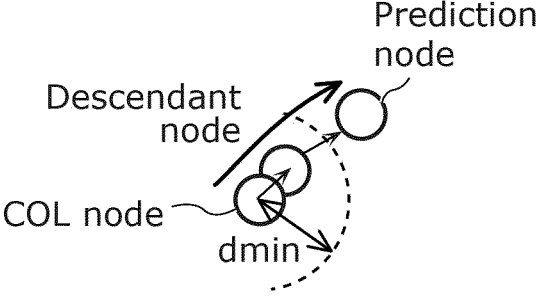
FIG. 14 is a diagram illustrating an example selection of a prediction node according to the embodiment.

In Step S103, three-dimensional data encoding device 100 then selects, based on the COL node, a prediction node from a plurality of nodes included in the reference frame. The prediction node is a node processed after the COL node, and is a child node of the COL node in the prediction tree, for example. Note that the base node may be a node at distance drain or more from the COL node. FIG. 14 is a diagram illustrating an example selection of the prediction node in this case. As illustrated in FIG. 14, three-dimensional data encoding device 100 may select, as a prediction node, a descendant node whose distance from the COL node based on the two direction components is greater than drain.

Three-dimensional data encoding device 100 may determine prediction values of the two direction components (horizontal angle and elevation angle) and a prediction value of the distance component using the prediction node selected in the inter prediction method illustrated in FIG. 12, or may determine prediction values of the two direction components (horizontal angle and elevation angle) and a prediction value of the distance component in different prediction methods. That is, it is possible that three-dimensional data encoding device 100 uses the inter prediction method described above for one of the two direction components (horizontal angle and elevation angle) and the distance component and does not use the inter prediction method for the other.

Three-dimensional data encoding device 100 may perform a combination of the method illustrated in FIG. 12 and the intra prediction method described with reference to FIGS. 9 and 10. For example, the inter prediction method illustrated in FIG. 12 is added to the plurality of prediction modes indicated by pred_mode_angle. Alternatively, the inter prediction method illustrated in FIG. 12 may be added to the plurality of prediction modes indicated by pred_mode. Furthermore, three-dimensional data encoding device 100 may use the inter prediction method for one of the two direction components (horizontal angle and elevation angle) and the distance component and use the intra prediction method for the other.

Three-dimensional data encoding device 100 may store information indicating drain in the syntax illustrated in FIG. 7, for example, as information for each sensing mode. Alternatively, when the sampling interval based on the two direction components for each sensing mode is known, three-dimensional data encoding device 100 may store, in the syntax illustrated in FIG. 7, information indicating the sampling interval as information for each sensing mode. In that case, three-dimensional data encoding device 100 and three-dimensional data decoding device 200 determine drain based on the sampling interval. For example, three-dimensional data encoding device 100 and three-dimensional data decoding device 200 may calculate, as drain, a half of the value of the sampling interval.

The method of determining the distance between nodes can be any method that can determine that the nodes are spaced apart from each other by a certain distance by comparison with the sampling interval. For example, three-dimensional data encoding device 100 may compare the sum of squares of the two direction components and the square of drain, determine that the distance between the nodes is equal to or greater than drain when the sum of squares of the two direction components is equal to or greater than the square of drain, and otherwise determine that the distance between the nodes is smaller than drain. Alternatively, three-dimensional data encoding device 100 may compare each of the two direction components with a predetermined value based on drain (such as the above formula (Formula 2) or an approximate value thereof), determine that the distance between the nodes is equal to or greater than drain when at least one of the two direction components is equal to or greater than the predetermined value, and otherwise determine that the distance between the nodes is smaller than drain.

As described above, three-dimensional data encoding device 100 can more precisely predict the two direction components (horizontal angle and elevation angle) of the position information of a node by using a prediction mode included in the processed reference frame. Therefore, there is a possibility that the coding efficiency can be improved.

Note that the prediction process in three-dimensional data decoding device 200 is the same as that described above. Three-dimensional data decoding device 200 obtains parameters (gps_fov_pred_mode_flag, pred_mode_angle, pred_mode, drain and the like) stored in the bitstream by three-dimensional data encoding device 100, and performs the prediction process described above based on the parameters.

Although a case where a prediction tree is used in the prediction process has been described above as an example, the same process can be applied not only to cases where a prediction tree is used but also to cases where the scan order or processing order is prescribed. In that case, the processing order described above can be applied, instead of the order in the prediction tree (such as a parent node and the like) described above. For example, the same process may be applied in a case where a method is used in which a plurality of reference positions determined by the two direction components (horizontal angle and elevation angle) are processed in a predetermined order. Note that in that method, the position of each of a plurality of three-dimensional points is associated with any of the plurality of reference positions, and the difference between the position of each three-dimensional point and the reference position associated with each other is calculated and encoded.

Although a case where point cloud data obtained with sensors that scan the angular field of view as illustrated in FIG. 5 and the like is encoded has been described above as an example, the prediction process described above may be applied to point cloud data obtained in other methods. For example, the same process may be performed on point cloud data obtained with sensors that perform the rotary scan, in which a continuous scan occurs in one direction.

The three-dimensional data encoding device according to this embodiment performs the process illustrated in FIG. 15 as described above. The three-dimensional data encoding device determines a first prediction value of a distance component (such as a distance component in the polar coordinate system) included in position information of a three-dimensional point in a first method (S111), and determines a second prediction value of a direction component (such as an elevation angle or horizontal angle in the polar coordinate system) included in the position information in a second method that is different from the first method (S112). For example, the three-dimensional data encoding device calculates a first residual between the distance component included in the position information and the first prediction value and calculates a second residual between the direction component included in the position information and the second prediction value. For example, the three-dimensional data encoding device generates a bitstream including the first residual and the second residual. Thus, the three-dimensional data encoding device can use a prediction method suitable for each of the distance component and the direction component, so that there is a possibility that the coding efficiency can be improved.

For example, the first method is the inter prediction, and the second method is the intra prediction. In this case, there is a possibility that the three-dimensional data encoding method can improve the coding efficiency. Here, the distance component tends to be highly correlated with a prediction point temporally shifted, and the direction component tends to be spatially highly continuous. Therefore, the coding efficiency can be improved by using the inter prediction for the distance component and using the intra prediction for the direction component.

For example, in the second method, the second prediction value is calculated according to the scan speed of the sensors for generating three-dimensional points. For example, in the second method, the second prediction value is calculated according to a formula including a term concerning the scan speed (such as (p0−p1) in the (Formula 1)). Thus, the three-dimensional data encoding device can perform a prediction that takes the scan speed into account, so that the coding efficiency can be improved.

For example, in the second method, the second prediction value is calculated according to the scan speed and scan acceleration of the sensors. For example, the formula further includes a term concerning the scan acceleration (such as {(p0−p1)−(p1−p2)} in the (Formula 1)). Thus, the three-dimensional data encoding device can perform a prediction that takes the scan acceleration into account, so that the coding efficiency can be improved.

For example, as illustrated in (Formula 1), in the second method, the second prediction value is calculated according to 3×p0−3×p1+p2, where p0 is a direction component of position information of a first three-dimensional point encoded, p1 is a direction component of position information of a second three-dimensional point that precedes the first three-dimensional point in the encoding order, and p2 is a direction component of position information of a third three-dimensional point that precedes the second three-dimensional point in the encoding order. In this case, the three-dimensional data encoding device can perform a prediction that takes the scan speed and the scan acceleration into account, so that the coding efficiency can be improved. Specifically, 3×p0−3×p1+p2=p0+(p0−p1)+{(p0−p1)−(p1−p2)}, where the term (p0−p1) relates to the scan speed, and the term {(p0−p1)−(p1−p2)} relates to the scan acceleration.

For example, as illustrated in FIG. 11, in the second method, the second prediction value is calculated using the direction component of the first three-dimensional point spaced apart from the three-dimensional point by a predetermined distance (such as drain) or more and the direction component of the second three-dimensional point spaced apart from the first three-dimensional point by the predetermined distance or more. For example, in the second method, the second prediction value is calculated using the direction components of the position information of a plurality of three-dimensional points that are distant from each other by a predetermined distance (such as drain) or more among a plurality of encoded three-dimensional points. In this case, the three-dimensional data encoding device can calculate the prediction value using information of a plurality of three-dimensional points in a wider range, so that the precision of the prediction value can be improved. For example, a plurality of three-dimensional points at the same position (or close positions) can be prevented from being used for prediction.

For example, the three-dimensional data encoding device does not allow either of the inter prediction and the intra prediction to be used as both the first method and the second method. For example, the three-dimensional data encoding device does not allow the same method to be used as the first method and the second method. For example, the three-dimensional data encoding device generates setting information that indicates that either of the inter prediction and the intra prediction is not allowed to be used as both the first method and the second method. For example, the three-dimensional data encoding device generates setting information that indicates the same method is not allowed to be used as the first method and the second method. For example, the three-dimensional data encoding device stores the setting information in the bitstream.

For example, the three-dimensional data encoding device includes a processor and memory, and the processor performs the above process using the memory.

The three-dimensional data decoding device according to this embodiment performs the process illustrated in FIG. 16. The three-dimensional data decoding device obtains, from a bitstream, a first residual of a distance component (such as a distance component in the polar coordinate system) included in position information of a three-dimensional point and a second residual of a direction component (such as an elevation angle or a horizontal angle in the polar coordinate system) included in the position information (S121), determines a first prediction value of the distance component in a first method (S122), determines a second prediction value of the direction component in a second method that is different from the first method (S123), generates a decoded value of the distance component by adding the first residual and the first prediction value (S124), and generates a decoded value of the direction component by adding the second residual and the second prediction value (S125). Thus, the three-dimensional data decoding device can use a prediction method suitable for each of the distance component and the direction component, so that there is a possibility that the coding efficiency can be improved.

The first method is the inter prediction, and the second method is the intra prediction. In this case, there is a possibility that the three-dimensional data decoding device can improve the coding efficiency. Here, the distance component tends to be highly correlated with a prediction point temporally shifted, and the direction component tends to be spatially highly continuous. Therefore, the coding efficiency can be improved by using the inter prediction for the distance component and using the intra prediction for the direction component.

For example, in the second method, the second prediction value is calculated according to the scan speed of the sensors for generating three-dimensional points. For example, in the second method, the second prediction value is calculated according to a formula including a term concerning the scan speed (such as (p0−p1) in the (Formula 1)). Thus, the three-dimensional data decoding device can perform a prediction that takes the scan speed into account, so that the coding efficiency can be improved.

For example, in the second method, the second prediction value is calculated according to the scan speed and scan acceleration of the sensors. For example, the formula further includes a term concerning the scan acceleration (such as {(p0−p1)−(p1−p2)} in the (Formula 1)). Thus, the three-dimensional data decoding device can perform a prediction that takes the scan acceleration into account, so that the coding efficiency can be improved.

For example, as illustrated in (Formula 1), in the second method, the second prediction value is calculated according to 3×p0−3×p1+p2, where p0 is a direction component of position information of a first three-dimensional point encoded, p1 is a direction component of position information of a second three-dimensional point that precedes the first three-dimensional point in the encoding order, and p2 is a direction component of position information of a third three-dimensional point that precedes the second three-dimensional point in the encoding order. In this case, the three-dimensional data decoding device can perform a prediction that takes the scan speed and the scan acceleration into account, so that the coding efficiency can be improved. Specifically, 3×p0−3×p1+p2=p0+(p0−p1)+{(p0−p1)−(p1−p2)}, where the term (p0−p1) relates to the scan speed, and the term {(p0−p1)−(p1−p2)} relates to the scan acceleration.

For example, as illustrated in FIG. 11, in the second method, the second prediction value is calculated using the direction component of the first three-dimensional point spaced apart from the three-dimensional point by a predetermined distance (such as drain) or more and the direction component of the second three-dimensional point spaced apart from the first three-dimensional point by the predetermined distance or more. For example, in the second method, the second prediction value is calculated using the direction components of the position information of a plurality of three-dimensional points that are distant from each other by a predetermined distance (such as drain) or more among a plurality of encoded three-dimensional points. In this case, the three-dimensional data decoding device can calculate the prediction value using information of a plurality of three-dimensional points in a wider range, the precision of the prediction value can be improved. For example, a plurality of three-dimensional points at the same position (or close positions) can be prevented from being used for prediction.

For example, the three-dimensional data decoding device does not allow either of the inter prediction and the intra prediction to be used as both the first method and the second method. For example, the three-dimensional data decoding device does not allow the same method to be used as the first method and the second method. For example, the three-dimensional data decoding device obtains, from the bitstream, setting information that indicates that either of the inter prediction and the intra prediction is not allowed to be used as both the first method and the second method. For example, the three-dimensional data decoding device obtains, from the bitstream, setting information that indicates the same method is not allowed to be used as the first method and the second method.

For example, the three-dimensional data decoding device includes a processor and memory, and the processor performs the above process using the memory.

The three-dimensional data encoding device according to this embodiment generates a bitstream by encoding information about a plurality of positions of a plurality of three-dimensional points obtained with a sensor, and adds first information about the angular field of view of the sensor to the bitstream. In this case, the three-dimensional data decoding device that decodes the bitstream can know the angular field of view of the sensor. Therefore, for example, the three-dimensional data decoding device can integrate a plurality of three-dimensional points obtained with a plurality of sensors using the first information of the plurality of sensors.

For example, the first information includes second information (such as gps_sensor_direction) that indicates the direction (such as reference line L1) of the sensor.

For example, the first information includes third information (such as gps_sensor_fov_max and gps_sensor_fov_min) that indicates the range of the angular field of view.

For example, the three-dimensional data encoding device further adds, to the bitstream, fourth information (such as gps_sensor_origin_offset) that indicates an offset between the reference position and the position of the sensor. In this case, for example, three-dimensional data decoding device can integrate a plurality of three-dimensional points obtained with a plurality of sensors using the fourth information of the plurality of sensors.

For example, the three-dimensional data encoding device generates the bitstream by encoding information about a plurality of positions of a plurality of three-dimensional points obtained with a plurality of sensors including the sensor, and the bitstream includes the first information on a processing unit basis.

For example, the processing unit is a slice. Note that the processing unit may be a tile. For example, the processing unit may be a unit that can be individually decoded.

For example, the plurality of sensors are mounted on one mobile body.

For example, the bitstream includes encoded data obtained by encoding the information about the plurality of positions, and the three-dimensional data encoding device further determines the bit precision of the encoded data based on the first information.

For example, the three-dimensional data encoding device arithmetically encodes the information about the plurality of positions, and determines a context used for the arithmetic encoding based on the first information.

The three-dimensional data decoding device according to this embodiment generates information about a plurality of positions of a plurality of three-dimensional points obtained with a sensor by decoding a bitstream, and obtains, from the bitstream, first information about the angular field of view of the sensor. In this case, the three-dimensional data decoding device can know the angular field of view of the sensor. Therefore, for example, the three-dimensional data decoding device can integrate a plurality of three-dimensional points obtained with a plurality of sensors using the first information of the plurality of sensors.

For example, the first information includes second information (such as gps_sensor_direction) that indicates the direction (such as reference line L1) of the sensor.

For example, the first information includes third information (such as gps_sensor_fov_max and gps_sensor_fov_min) that indicates the range of the angular field of view.

For example, the three-dimensional data decoding device further obtains, from the bitstream, fourth information (such as gps_sensor_origin_offset) that indicates an offset between the reference position and the position of the sensor. In this case, for example, three-dimensional data decoding device can integrate a plurality of three-dimensional points obtained with a plurality of sensors using the fourth information of the plurality of sensors.

For example, the three-dimensional data decoding device generates information about a plurality of positions of a plurality of three-dimensional points obtained with a plurality of sensors including the sensor, and the bitstream includes the first information on a processing unit basis.

For example, the processing unit is a slice. Note that the processing unit may be a tile. For example, the processing unit may be a unit that can be individually decoded.

For example, the plurality of sensors are mounted on one mobile body.

For example, the three-dimensional data decoding device arithmetically decodes encoded data generated by arithmetically encoding the information about the plurality of positions included in the bitstream, and determines a context used for the arithmetic decoding based on the first information.

A three-dimensional data encoding device, a three-dimensional data decoding device, and the like according to the embodiments of the present disclosure have been described above, but the present disclosure is not limited to these embodiments.

Note that each of the processors included in the three-dimensional data encoding device, the three-dimensional data decoding device, and the like according to the above embodiments is typically implemented as a large-scale integrated (LSI) circuit, which is an integrated circuit (IC). These may take the form of individual chips, or may be partially or entirely packaged into a single chip.

Such IC is not limited to an LSI, and thus may be implemented as a dedicated circuit or a general-purpose processor. Alternatively, a field programmable gate array (FPGA) that allows for programming after the manufacture of an LSI, or a reconfigurable processor that allows for reconfiguration of the connection and the setting of circuit cells inside an LSI may be employed.

Moreover, in the above embodiments, the structural components may be implemented as dedicated hardware or may be realized by executing a software program suited to such structural components. Alternatively, the structural components may be implemented by a program executor such as a CPU or a processor reading out and executing the software program recorded in a recording medium such as a hard disk or a semiconductor memory.

The present disclosure may also be implemented as a three-dimensional data encoding method, a three-dimensional data decoding method, or the like executed by the three-dimensional data encoding device, the three-dimensional data decoding device, and the like.

Also, the divisions of the functional blocks shown in the block diagrams are mere examples, and thus a plurality of functional blocks may be implemented as a single functional block, or a single functional block may be divided into a plurality of functional blocks, or one or more functions may be moved to another functional block. Also, the functions of a plurality of functional blocks having similar functions may be processed by single hardware or software in a parallelized or time-divided manner.

Also, the processing order of executing the steps shown in the flowcharts is a mere illustration for specifically describing the present disclosure, and thus may be an order other than the shown order. Also, one or more of the steps may be executed simultaneously (in parallel) with another step.

A three-dimensional data encoding device, a three-dimensional data decoding device, and the like according to one or more aspects have been described above based on the embodiments, but the present disclosure is not limited to these embodiments. The one or more aspects may thus include forms achieved by making various modifications to the above embodiments that can be conceived by those skilled in the art, as well forms achieved by combining structural components in different embodiments, without materially departing from the spirit of the present disclosure.

INDUSTRIAL APPLICABILITY

The present disclosure is applicable to a three-dimensional data encoding device and a three-dimensional data decoding device.

REFERENCE SIGNS LIST 100 three-dimensional data encoding device
102 subtractor
103 quantizer
104 entropy encoder
105, 202 inverse quantizer
106, 203 adder
108, 110, 205, 207 buffer
109, 206 intra predictor
111 motion detector/compensator
112, 209 inter predictor
113, 210 switch
200 three-dimensional data decoding device
201 entropy decoder
208 motion compensator
300 mobile body
301 sensor
302 controller

The invention claimed is:

1. A three-dimensional data encoding method comprising:
determining, by a first method, a first prediction value of a distance component included in position information of a three-dimensional point; and
determining, by a second method, a second prediction value of a direction component included in the position information,
wherein one of the first method or the second method is inter prediction, and the other of the first method or the second method is intra prediction, and
in the intra prediction, a prediction value is calculated according to a scan speed of a sensor for generating the three-dimensional point and a scan acceleration rate of the sensor.

2. The three-dimensional data encoding method according to claim 1,
wherein the first method is inter prediction, and
the second method is intra prediction.

3. The three-dimensional data encoding method according to claim 2,
wherein in the second method, the second prediction value is calculated by $3 \times p0 - 3 \times p1 + p2$, where
p0 denotes a direction component included in position information of a first three-dimensional point encoded,
p1 denotes a direction component included in position information of a second three-dimensional point that precedes the first three-dimensional point in an encoding order, and
p2 denotes a direction component included in position information of a third three-dimensional point that precedes the second three-dimensional point in the encoding order.

4. The three-dimensional data encoding method according to claim 2,
wherein in the second method, the second prediction value is calculated using a direction component of a first three-dimensional point and a direction component of a second three-dimensional point, the first three-dimensional point being located apart from the three-dimensional point by at least a predetermined distance, the second three-dimensional point being located apart from the three-dimensional point by at least the predetermined distance.

5. A three-dimensional data decoding method comprising:
obtaining, from a bitstream, a first residual of a distance component included in position information of a three-dimensional point and a second residual of a direction component included in the position information;
determining, by a first method, a first prediction value of the distance component; and determining, by a second method, a second prediction value of the direction component, wherein one of the first method or the second method is inter prediction, and the other of the first method or the second method is intra prediction, and in the intra prediction, a prediction value is calculated according to a scan speed of a sensor for generating the three-dimensional point and a scan acceleration rate of the sensor.

6. The three-dimensional data decoding method according to claim 5, wherein the first method is inter prediction, and the second method is intra prediction.

7. The three-dimensional data decoding method according to claim 6, wherein in the second method, the second prediction value is calculated by $3 \times p0 - 3 \times p1 + p2$, where p0 denotes a direction component included in position information of a first three-dimensional point decoded, p1 denotes a direction component included in position information of a second three-dimensional point that precedes the first three-dimensional point in an encoding order, and p2 denotes a direction component included in position information of a third three-dimensional point that precedes the second three-dimensional point in the encoding order.

8. The three-dimensional data decoding method according to claim 6, wherein in the second method, the second prediction value is calculated using a direction component of a first three-dimensional point and a direction component of a second three-dimensional point, the first three-dimensional point being located apart from the three-dimensional point by at least a predetermined distance, the second three-dimensional point being located apart from the three-dimensional point by at least the predetermined distance.

9. A three-dimensional data encoding device comprising:

a processor; and memory, wherein using the memory, the processor:

determines, by a first method, a first prediction value of a distance component included in position information of a three-dimensional point; and determines, by a second method, a second prediction value of a direction component included in the position information, wherein one of the first method or the second method is inter prediction, and the other of the first method or the second method is intra prediction, and in the intra prediction, a prediction value is calculated according to a scan speed of a sensor for generating the three-dimensional point and a scan acceleration rate of the sensor.

10. A three-dimensional data decoding device comprising:

a processor; and memory, wherein using the memory, the processor:

obtains, from a bitstream, a first residual of a distance component included in position information of a three-dimensional point and a second residual of a direction component included in the position information;

determines, by a first method, a first prediction value of the distance component; and determines, by a second method, a second prediction value of the direction component, wherein one of the first method or the second method is inter prediction, and the other of the first method or the second method is intra prediction, and in the intra prediction, a prediction value is calculated according to a scan speed of a sensor for generating the three-dimensional point and a scan acceleration rate of the sensor.

* * * * *